(12) United States Patent
Seo et al.

(10) Patent No.: US 11,727,825 B2
(45) Date of Patent: Aug. 15, 2023

(54) BRAILLE TEACHING MATERIAL AND METHOD OF MANUFACTURING SAME

(71) Applicant: SENSEE, INC., Daejeon (KR)

(72) Inventors: In Sik Seo, Daejeon (KR); Ji Yun Cho, Daejeon (KR)

(*) Notice: Subject to any disclaimer, the term of this patent is extended or adjusted under 35 U.S.C. 154(b) by 274 days.

(21) Appl. No.: 17/062,013

(22) Filed: Oct. 2, 2020

(65) Prior Publication Data

US 2022/0044591 A1 Feb. 10, 2022

(30) Foreign Application Priority Data

Aug. 10, 2020 (KR) .................. 10-2020-0100072

(51) Int. Cl.
*G09B 21/00* (2006.01)

(52) U.S. Cl.
CPC .................. *G09B 21/004* (2013.01)

(58) Field of Classification Search
CPC ............... G09B 21/003; G09B 21/004; G09B 21/007
See application file for complete search history.

(56) References Cited

U.S. PATENT DOCUMENTS

| | | | | |
|---|---|---|---|---|
| 2,371,325 A * | 3/1945 | Wessborg | ............ | G09B 21/003 116/DIG. 17 |
| 2,456,155 A | 12/1948 | Seaman | | |
| 3,869,813 A | 3/1975 | Haney | | |
| 3,895,804 A * | 7/1975 | Lee | .................... | A63F 3/00574 273/242 |
| 4,425,095 A * | 1/1984 | Morris | .................. | G09B 11/04 434/117 |
| 5,161,975 A * | 11/1992 | Andrews | .............. | G09B 21/003 434/112 |
| 5,558,520 A * | 9/1996 | Werzberger | .............. | G09B 3/00 434/327 |
| 5,720,616 A * | 2/1998 | Schuler, III | .......... | G09B 21/003 29/525 |
| 2003/0099920 A1 | 5/2003 | Edwards et al. | | |
| 2018/0197433 A1* | 7/2018 | Tavares | ................ | G09B 21/007 |
| 2021/0142694 A1* | 5/2021 | Schultz | ................ | G09B 21/007 |

FOREIGN PATENT DOCUMENTS

| | | |
|---|---|---|
| GB | 1540799 | 2/1979 |
| JP | H11157201 A | 6/1999 |
| JP | 3143306 U | 6/2008 |
| JP | 4147494 B1 | 7/2008 |
| KR | 10-0491108 | 5/2005 |
| KR | 10-0849449 | 7/2008 |
| KR | 20-2009-0000338 | 1/2009 |
| KR | 10-1650099 | 8/2016 |
| KR | 10-2016-0113760 | 10/2016 |
| KR | 10-2017-0051831 | 5/2017 |
| KR | 1020170119941 | 10/2017 |
| WO | 2009086308 | 7/2009 |

\* cited by examiner

*Primary Examiner* — Peter R Egloff
(74) *Attorney, Agent, or Firm* — Revolution IP, PLLC

(57) ABSTRACT

Provided is a braille teaching material, and a method of manufacturing the same. More particularly, the present disclosure relates to a braille teaching material, and a method of manufacturing the same, wherein a teaching tool is detachably attached to a dot corresponding to a raised dot of braille among vertical dots and horizontal dots of braille, so that even braille beginners with undeveloped fingertip sensitivity are able to learn braille.

7 Claims, 8 Drawing Sheets

BRAILLE TEACHING MATERIAL AND METHOD OF MANUFACTURING SAME

CROSS REFERENCE TO RELATED APPLICATION

The present application claims priority to Korean Patent Application No. 10-2020-0100072, filed Aug. 10, 2020, the entire contents of which is incorporated herein for all purposes by this reference.

TECHNICAL FIELD

The present disclosure relates to a braille teaching material, and a method of manufacturing the same. More particularly, the present disclosure relates to a braille teaching material, and a method of manufacturing the same, wherein a teaching tool is detachably attached to a dot corresponding to a raised dot of braille among vertical dots and horizontal dots of braille, so that even braille beginners with undeveloped fingertip sensitivity are able to learn braille.

BACKGROUND

Braille is a character symbol system that gives meaning to various dot patterns so that people can read and write through the sense of touch. In general, 3*2 or 4*2 dot patterns are widely used for such braille, and the character system is constructed by varying the number and arrangement of dots.

For people who are visually impaired, braille is not just a simple means of accessing information access, but a key means of providing opportunities to live much better.

Braille education provides more educational opportunities, communication with the world, and even more various occupations and economical opportunities.

There are about 285 million people who are visually impaired around the world, but only around 10% of them are able to read and write braille (including people with low vision).

Currently, there is a shortage of specialized teachers in the field of braille education, and there is also a shortage of interesting educational materials and tools for visually-impaired children to access braille easily.

Actual printed braille is small. Braille beginners with undeveloped fingertip sensitivity, diabetic patients with sensory impairment, people visually impaired due to age, and the like have difficulty in learning and getting used to braille in the actual size, so many visually handicapped people give up.

A picture book in braille, and a teaching material set including the same are disclosed in Korean Patent No. 10-0849449.

The foregoing is intended merely to aid in the understanding of the background of the present disclosure, and is not intended to mean that the present disclosure falls within the purview of the related art that is already known to those skilled in the art.

DOCUMENT OF RELATED ART (Patent Document 1) Korean Patent No. 10-0849449 (registration date: Jul. 24, 2008)

SUMMARY

Accordingly, the present disclosure has been made keeping in mind the above problems occurring in the related art, and the present disclosure is directed to providing a braille teaching material, and a method of manufacturing the same, wherein a teaching tool is detachably attached to a dot corresponding to a raised dot of braille among vertical dots and horizontal dots of braille, so that even braille beginners with undeveloped fingertip sensitivity are able to learn braille.

The objective of the embodiments of the present disclosure is not limited to the above-described objective, and other objectives which are not described herein will be come apparent to those skilled in the art from the following description.

According to an embodiment of the present disclosure, there is provided a braille teaching material including: an information section (100) showing learning information, not braille, to be used for learning, in a preset learning area; a braille section (200) showing dots (210) corresponding to vertical dots and horizontal dots of braille in a preset braille area; and a teaching tool (300) seated or detachably attached to the dot (210).

The information section (100) shows the information provided in an uneven shape.

When the information to be used for learning is a letter, the information section (100) includes a stroke part (110) indicating a direction in which each stroke of the letter is written.

When the information to be used for learning is a letter, the information section (100) includes a start part (120) indicating a point at which each stroke of the letter starts.

The braille teaching material further includes a stroke order guidance section (400) in a preset area of opened pages of the braille teaching material, the stroke order guidance section (400) showing symbols that correspond to the start parts (120) and are arranged in the same order as the strokes of the letter are written.

The braille section (200) shows which dot (210) corresponds to a raised dot of braille, in a visual manner, in a tactile manner, or in a visual and tactile manner.

The braille section (200) includes a velcro provided at a position of the dot (210).

The braille teaching material further including: an NFC tag (not shown) provided in a preset tag area, and storing information required for voice guiding the learning information; and an NFC reader (not shown) outputting the learning information in a voice when recognizing the NFC tag.

A sheet provided with the dots (210) is formed by stacking, in order, an outer layer (1100) in which the dots (210) are formed in a hole shape, and an inner layer (1200) with a meaning part (220) configured to be distinguishable by the sense of the hand at a position of the dot (210).

According to an embodiment of the present disclosure, there is provided a method of manufacturing a braille teaching material, the method including: punching, at an outer layer punching step (S10), the dots (210) or the dots (210) and the learning information of the information section (100) in the outer layer (1100); and manufacturing, at a sheet manufacturing step (S20), the sheet provided with the dots (210) by stacking the outer layer (1100) and the inner layer (1200) or by stacking the outer layer (1100), the inner layer (1200), and the outer layer (1100) in order and bonding the layers.

The sheet provided with the dots (210) is manufactured by using an adhesive sheet.

In the braille teaching material and the method of manufacturing the same according to an embodiment of the present disclosure, a teaching tool is detachably attached to a dot corresponding to a raised dot of braille among vertical dots and horizontal dots of braille, so that even braille beginners with undeveloped fingertip sensitivity are able to learn braille.

In addition, since the information section is provided in an uneven shape, the visually impaired person is able to identify the learning information alone and is thus able to learn braille alone.

In addition, since the direction in which each stroke of a letter is written is provided, the visually impaired person is able to identify in which direction the visually impaired person needs to touch and follow the letter, so that the visually impaired person is able to easily identify the letter.

In addition, since the point at which each stroke of a letter starts is provided, the point at which the stroke of the letter starts is quickly identified, so that the time required to identify the letter is shortened.

In addition, the stroke order guidance section in which symbols are arranged in the same order as strokes of a letter are written is provided, so that the visually impaired person is able to learn the stroke order of the letter.

In addition, which dot corresponds to the raised dot of braille is provided in a visual manner, in a tactile manner, or in a visual and tactile manner, so that even people who do not know braille are able to help the visually impaired person to learn braille.

In addition, a braille section are formed, where any powder is mixed with an adhesive and is attached to the position of the dot corresponding to the raised dot of braille, so that it is easy for unimpaired people and the visually impaired people to identify which dot corresponds to the raised dot of braille, without any indications.

In addition, since a sheet provided with dots is formed by stacking the outer layer and the inner layer, the outer layer and the inner layer are separately manufactured and are bonded, whereby manufacturing a sheet provided with dots is facilitated.

Further, the braille teaching material is manufactured through the outer layer punching step and the sheet manufacturing step, whereby the braille teaching material can be made more easily.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
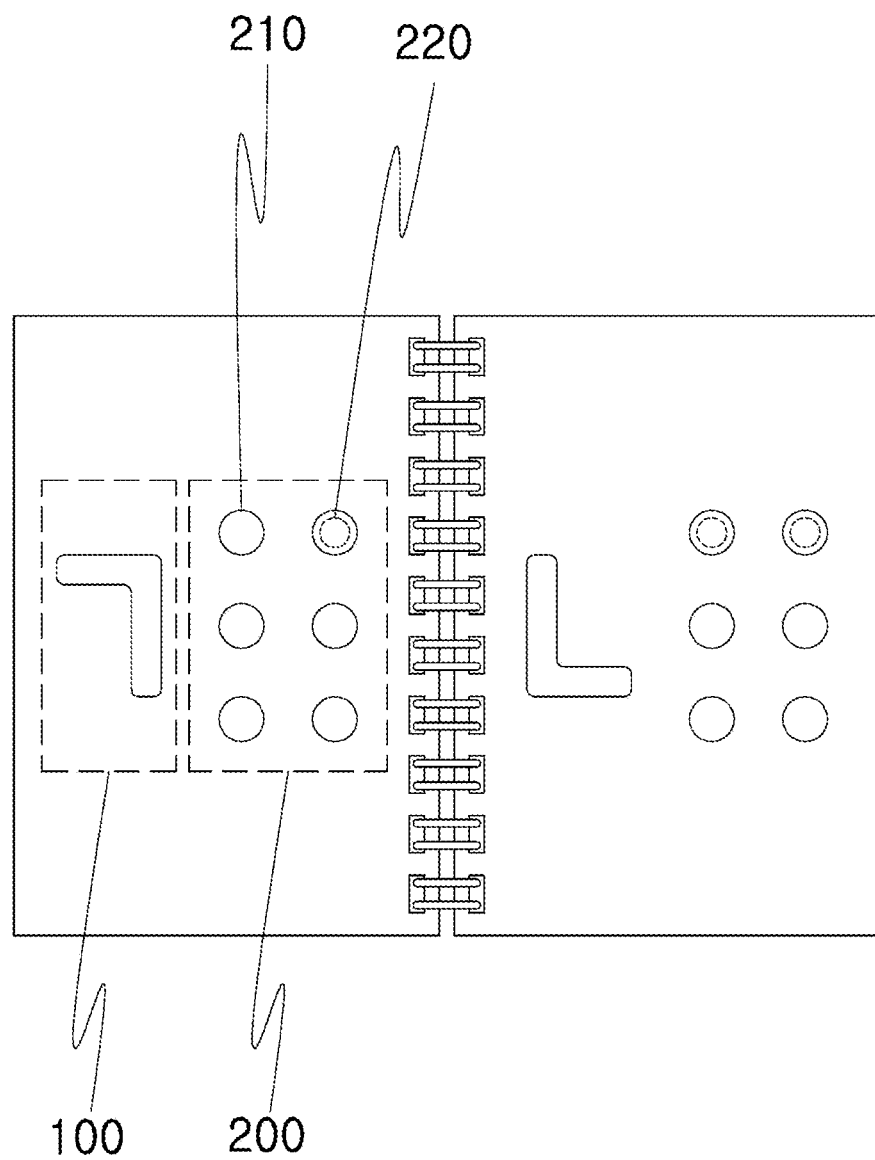
FIG. 1 is a diagram illustrating a braille teaching material according to an embodiment of the present disclosure, specifically, an example in which an information section and a braille section are provided on one page.

The present disclosure may be modified in various ways and implemented by various embodiments, so that specific embodiments are shown in the drawings and will be described in detail. However, the present disclosure is not limited to the specific embodiments, but may include all modifications, equivalents and substitutions within the scope of the present disclosure.

It will be understood that when an element is referred to as being "connected" or "coupled" to another element, it can be directly connected or coupled to the other element or intervening elements may be present.

In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises", "comprising", "includes", and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Herein, with reference to the accompanying drawings, embodiments of the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. In addition, technical terms and scientific terms used in the present specification have the general meaning understood by those skilled in the art to which the present disclosure pertains unless otherwise defined, and a description for the known function and configuration obscuring the present disclosure will be omitted in the following description and the accompanying drawings. The drawings to be provided below are provided by way of example so that the idea of the present disclosure can be sufficiently delivered to a person skilled in the art to which the present disclosure pertains. Therefore, the present disclosure is not limited to the drawings provided below but may be modified in many different forms. In addition, like reference numerals designate like elements throughout the specification. In the drawings, same reference numerals denote same components throughout the disclosure.

Figure 2:
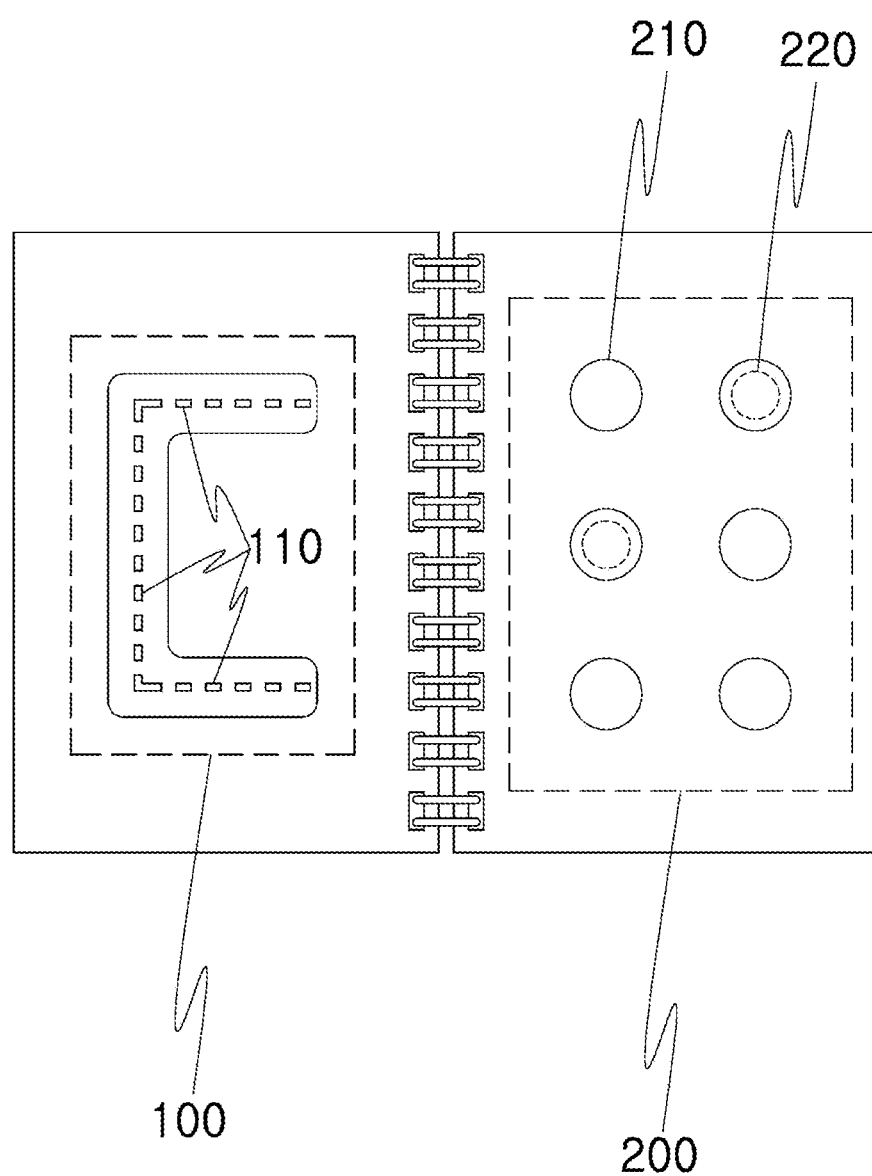
FIG. 2 is a diagram illustrating a braille teaching material according to an embodiment of the present disclosure, specifically, an example in which among opened pages of the braille teaching material, one page is provided with an information section and the other page is provided with a braille section, and in which a stroke part is provided.
Figure 3:
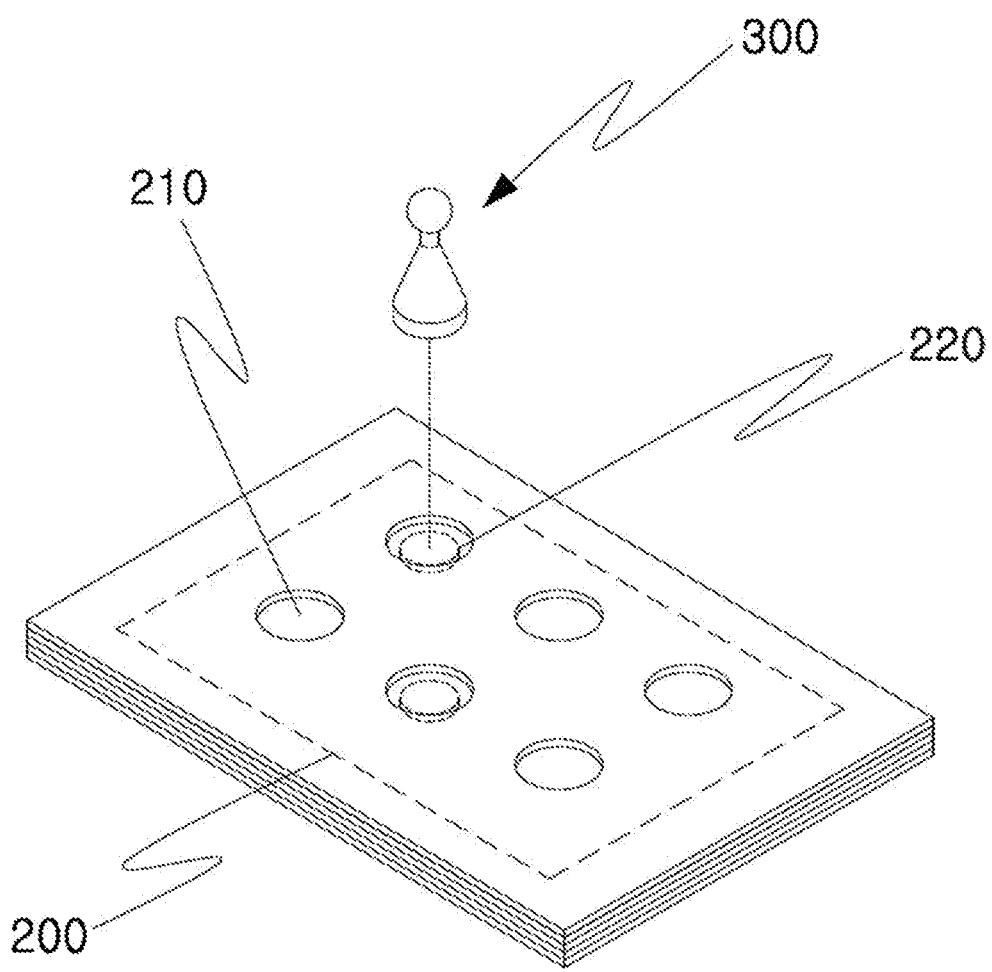
FIG. 3 is a diagram illustrating a braille teaching material according to an embodiment of the present disclosure, specifically, an example in which a teaching tool is attached to a dot provided with a magnetic part in a page where a braille section is provided.
Figure 4:
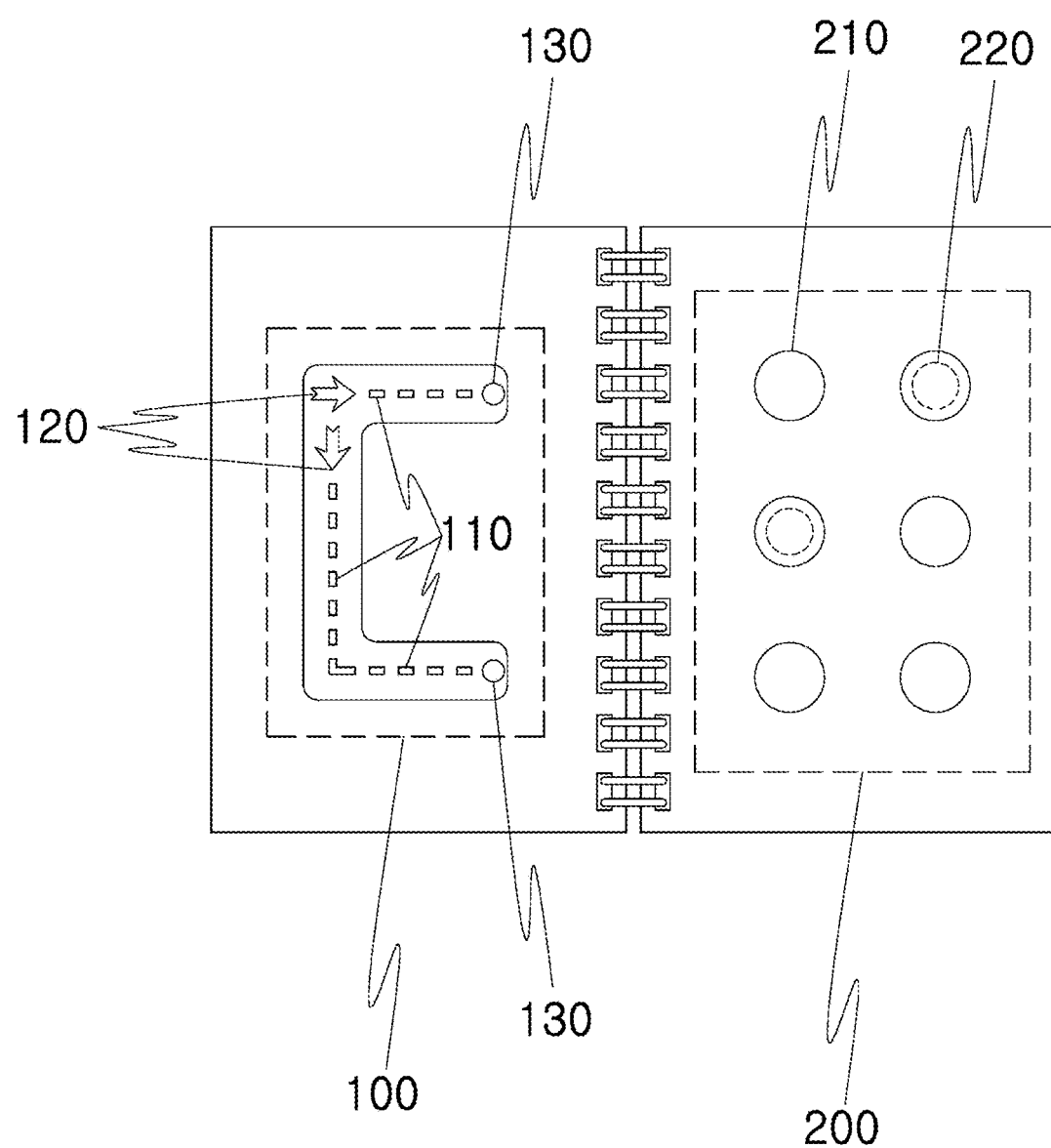
FIG. 4 is a diagram illustrating an example in which a start part and an end part are added to the example of FIG. 2.
Figure 5:
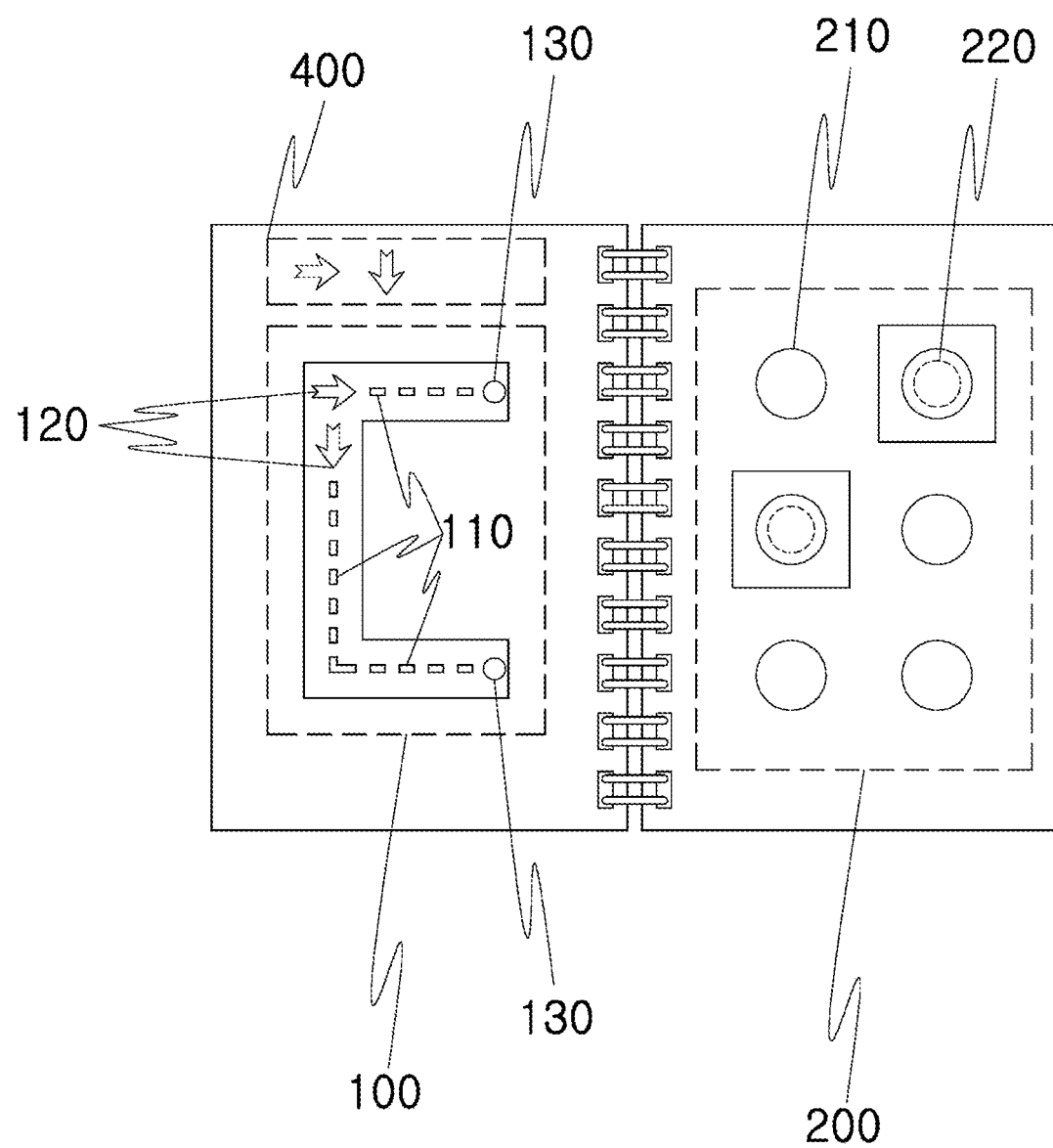
FIG. 5 is a diagram illustrating an example in which a stroke order guidance section is added to the example of FIG. 4.
Figure 6:
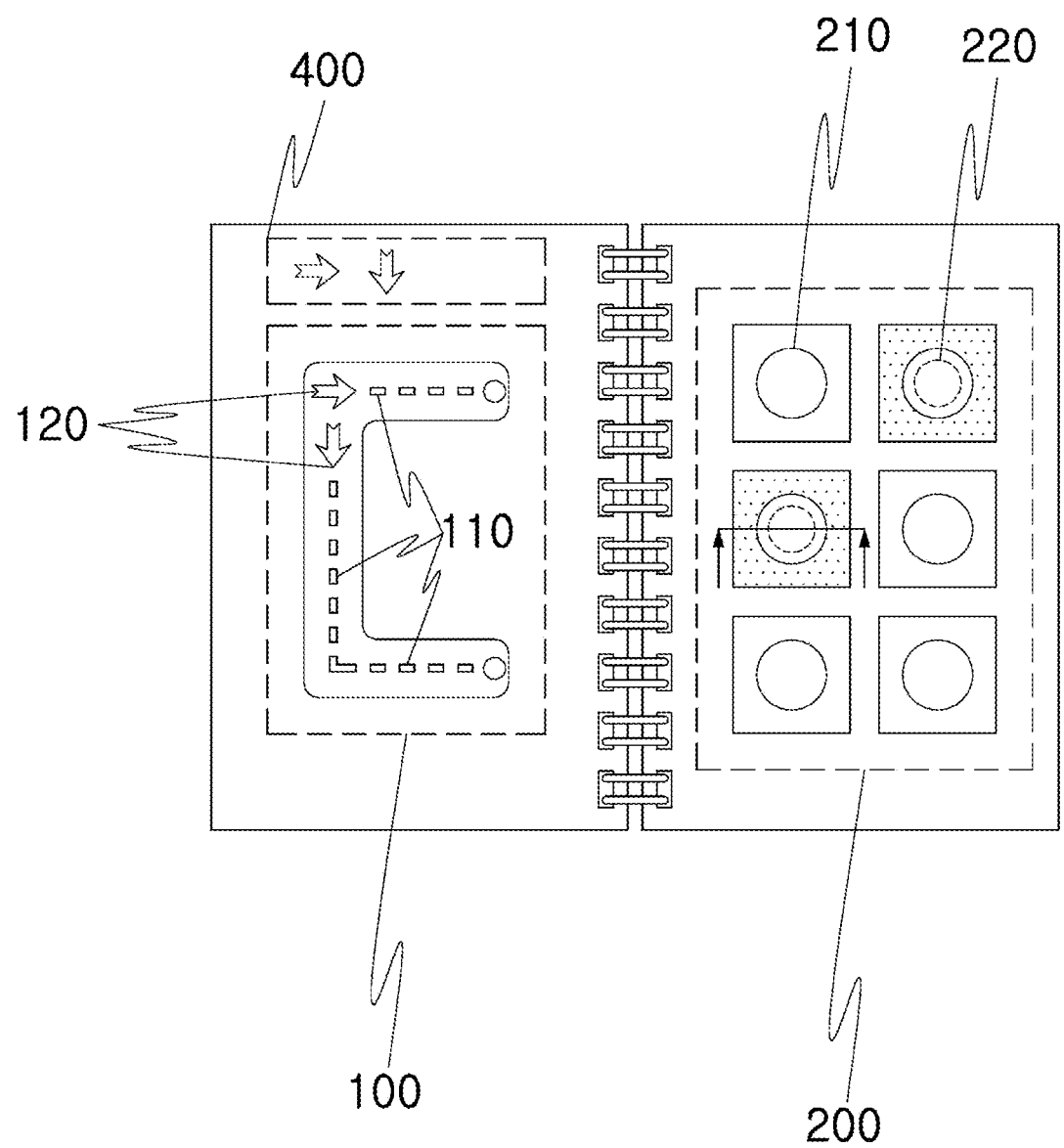
FIG. 6 is a diagram illustrating an example in which raised dots of braille of FIG. 5 are provided in a visual manner, in a tactile manner, or in a visual and tactile manner.
Figure 7:
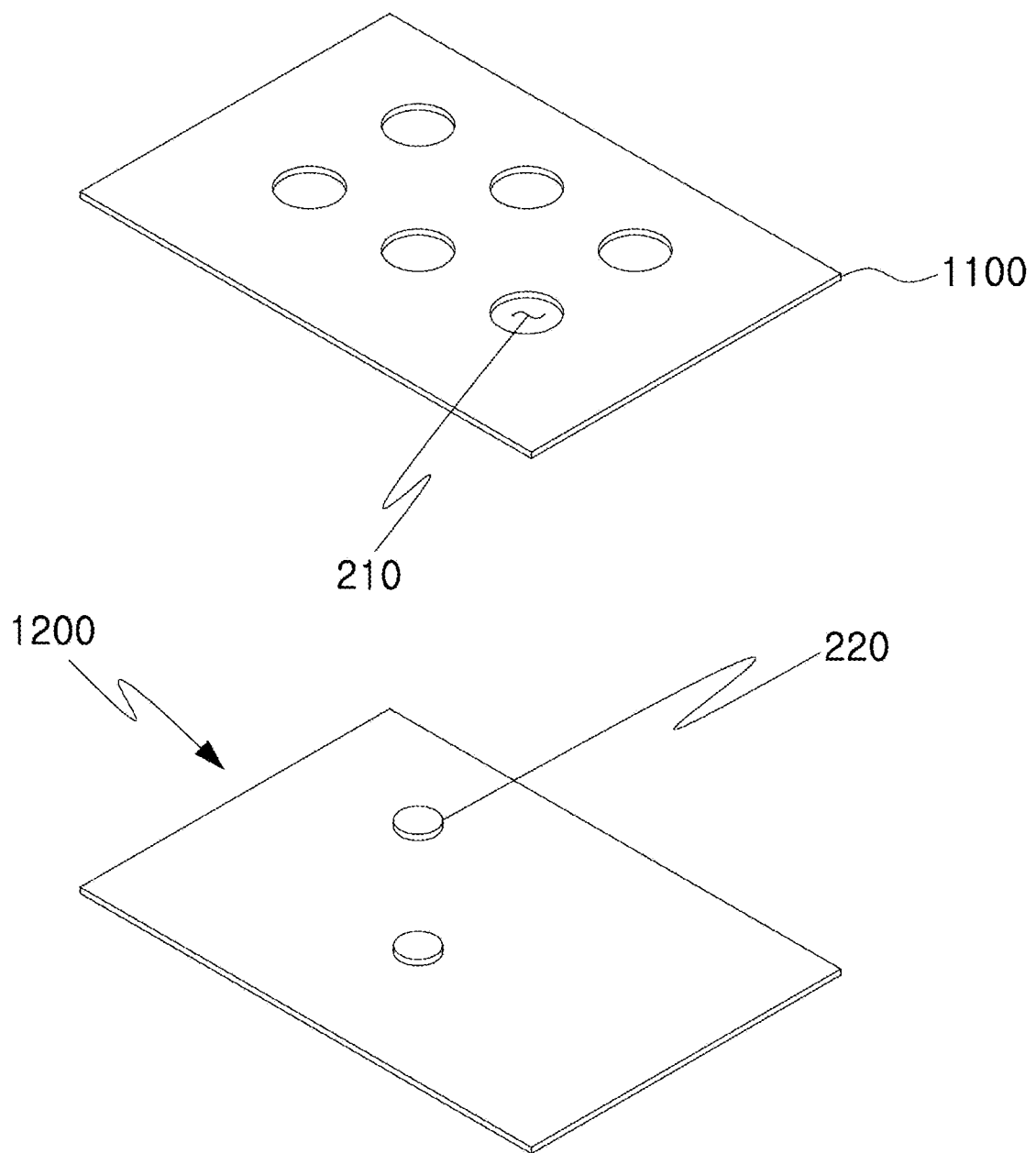
FIG. 7 is a diagram illustrating an example in which a sheet where a braille section of a braille teaching material is provided is manufactured by stacking an outer layer and an inner layer, according to an embodiment of the present disclosure.
Figure 8:
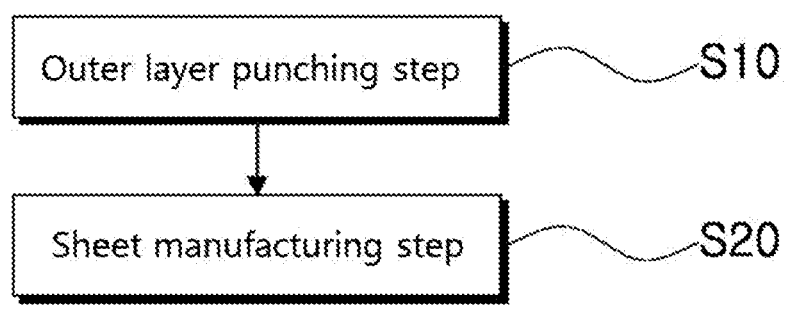
FIG. 8 is a flowchart illustrating a method of manufacturing a braille teaching material according to an embodiment of the present disclosure.

FIG. 1 is a diagram illustrating a braille teaching material according to an embodiment of the present disclosure, specifically, an example in which an information section and a braille section are provided on one page. FIG. 2 is a diagram illustrating a braille teaching material according to an embodiment of the present disclosure, specifically, an example in which among opened pages of the braille teaching material, one page is provided with an information section and the other page is provided with a braille section, and in which a stroke part is provided. FIG. 3 is a diagram illustrating a braille teaching material according to an embodiment of the present disclosure, specifically, an example in which a teaching tool is attached to a dot provided with a magnetic part in a page where a braille section is provided. FIG. 4 is a diagram illustrating an example in which a start part and an end part are added to the example of FIG. 2. FIG. 5 is a diagram illustrating an example in which a stroke order guidance section is added to the example of FIG. 4. FIG. 6 is a diagram illustrating an example in which raised dots of braille of FIG. 5 are provided in a visual manner, in a tactile manner, or in a visual and tactile manner. FIG. 7 is a diagram illustrating an example in which a sheet where a braille section of a braille teaching material is provided is manufactured by stacking an outer layer and an inner layer, according to an embodiment of the present disclosure. FIG. 8 is a flowchart illustrating a method of manufacturing a braille teaching material according to an embodiment of the present disclosure.

According to an embodiment of the present disclosure, an braille teaching material includes an information section 100, a braille section 200, and a teaching tool 300.

The information section 100 shows learning information, not braille, to be used for learning in a preset learning area.

Herein, the learning information refers to information, such as a character (a letter, a number, a sign, or the like), an image, or the like, for braille learning.

In FIG. 1, the information section 100 is provided on the left side of a page and is sections where the Korean letters "ㄱ" and "ㄴ" are shown. In FIG. 2, the information section 100 is provided on the left page among the opened pages of the braille teaching material and is a section where the Korean letter "ㄷ" is shown.

FIGS. 1 and 2 show that the information section 100 is provided on the left side with respect to the braille section 200 which will be described later, but the present disclosure is not limited thereto. The information section 100 may be embodied in various ways as being provided on the right side, the upper side, the lower side, and the like with respect to the braille section 200.

The braille section 200 shows dots 210 corresponding to vertical dots and horizontal dots of braille in a preset braille area.

In the braille section 200, the showing of the dots 210 corresponding to the vertical dots and horizontal dots of braille means that the dots 210 are shown in such a manner as to be distinguished from other parts, and also means that the dots 210 are distinguished in a visual and tactile manner. This is because the braille teaching material is for the visually impaired.

Herein, it is preferable to form the dots 210 in an engraved shape so as to be distinguished from other parts.

This is to serve as a guide when attaching the teaching tool 300 which will be described later to the position corresponding to the dot 210.

In other words, when attaching the teaching tool 300 to the dot 210, it is identified that the teaching tool 300 is attached into the area recessed compared with other parts, whereby it is easy to identify whether the teaching tool 300 is attached to the correct position corresponding to the dot 210.

In the braille section 200, a meaning part 220 may be formed to be distinguishable by the sense of the hand at a position of the dot 210.

The meaning part 220 may be provided in various ways, for example, the meaning part 220 may form all dots 210 identical, or the may part 220 may form the dots 210 corresponding to the raised dots of braille showing information of the information section 100 to be distinguished from the other dots 210.

The teaching tool 300 is seated or detachably attached to the dots 210 (see FIG. 3).

For example, when the dot 210 is formed in a concave step, the teaching tool 300 may be seated in the stepped concave inward of the dot 210 by gravity.

Herein, the 'the teaching tool 300 is seated' means that the teaching tool 300 takes place, and once the teaching tool 300 is seated, it means that the seat can be moved only when an external force above a certain level is applied.

As another example, the teaching tool 300 is formed in such a manner that the lower part of the teaching tool 300 formed in a structure (such as velcro) that is detachable to the dot 210, and the upper part of the teaching tool 300 is gripped by hand.

When the user holds the teaching tool 300 in the user's hand and moves the teaching tool 300 to pass between the dots 210, the teaching tool 300 may be attached to the dot 210 due to the detachable structure.

In this case, the teaching tool 300 may be detachable only at a dot 210 corresponding to a raised dot of braille representing information shown in the information section 100.

In the braille teaching material according to an embodiment of the present disclosure, the teaching tool 300 is seated or detachably attached to the position of the dot 210 corresponding to the raised dot of braille, so that even those who have undeveloped fingertip sensitivity are able to learn the shape of braille.

This is because braille can be learned more quickly by learning the shape of braille using a teaching material with a large braille size and then learning while reducing the size.

According to an embodiment of the present disclosure, the information section 100 of the braille teaching material may be characterized in the information is provided in an uneven shape.

That is, the learning information shown in the information section 100 may be provided in an uneven shape.

In other words, the learning information shown in the information section 100 may be provided in an uneven shape, such as an engraved shape, a raised shape, an embossed shape, or the like, which is distinguished by the touch of hand.

This is to enable the visually impaired person to identify learning information alone, and thus the visually impaired person is able to learn braille alone.

Although it is described that the information section 100 is provided in an uneven shape, as an example, the present disclosure is not limited thereto. The information section 100 may be embodied in various ways as being provided only as a general image, as a combination of a general image and an uneven shape, and the like.

According to an embodiment of the present disclosure, the information section 100 of the braille teaching material may include an engraved part (not shown) in which the information is formed in an engraved shape, and a raised part (not shown) that corresponds to the shape of the engraved part (not shown) and is formed in such a manner as to be interlocked to the engraved part (not shown).

Through this, the visually impaired person is able to easily identify the shape of the learning information alone.

That is, the user is able to learn by touching the engraved part (not shown) and identifying the learning information in the engraved shape, and learn by touching the raised part (not shown) and identifying the learning information in the raised shape.

The raised part (not shown) may be formed in such a manner as to be interlocked to the engraved part (not shown), but the forcible interlocking form is likely to be damaged due to the material characteristics of the teaching tool. Therefore, it is preferable that the raised part (not shown) is attached to the engraved part (not shown) using magnetic force.

That is, various embodiments are possible, for example the raised part (not shown) is provided with a magnet, the raised part (not shown) is made of a magnet, and so on.

As shown in FIG. 2, according to an embodiment of the present disclosure, in the case where information to be used for learning is a letter, the information section 100 of the braille teaching material includes a stroke part 110 indicating a direction in which each stroke of the letter is written.

The stroke part 110 is for informing how to write the strokes of the letter, and the direction of proceeding. The teacher who helps with learning may refer to the stroke part 110 to guide the learner.

Herein, the stroke part 110 may be provided in an uneven shape.

This is to help the learner to learn the letter alone. Herein, the stroke part 110 may serve as a guide so that the visually impaired person is able to identify in which direction the visually impaired person needs to touch and follow the letter.

Referring to FIG. 2, in the case where the stroke part 110 is formed in a raised shape, for example, only the stroke part 110 may be formed in a raised shape, but the " ㅣ ㅡ "-shaped border surrounding the stroke part 110 or the entire learning information may be formed in a raised shape.

FIG. 2 shows the stroke part 110 in a shape of broken line, but the present disclosure is not limited thereto. The stroke part 110 may be embodied in various ways, such as angle brackets (>), triangles (Δ), arrows (→), or the like.

As shown in FIG. 4, according to an embodiment of the present disclosure, in the case where information to be used for learning is a letter, the information section 100 of the braille teaching material includes start parts 120 each indicating a point at which each stroke of the letter starts.

The start part 120 is for informing where the stroke of the letter needs to start, and the point of the start. The teacher who helps with learning may refer to the start part 120 to guide the learner.

The start part 120 may be provided in various ways, for example, numbers, letters, figures, images, or the like.

As shown in FIG. 2, in the case where only the stroke part 110 is formed, the visually impaired person needs to pay attention around the letter with the fingers so as to identify the start and the end of the letter, and thus it takes time to identify the letter.

In order to help the learner to learn the letter alone, the start part 120 may be provided in an uneven shape.

The start part 120 enables the point at which the stroke of the letter starts to be identified quickly, and thus the time required to identify the letter is shortened.

As shown in FIG. 4, according to an embodiment of the present disclosure, in the case where information to be used for learning is a letter, the information section 100 of the braille teaching material includes end parts 130 each indicating a point at which each stroke of the letter ends.

The end part 130 is for information where the stroke of the letter needs to end, and the point of the end. The teacher who helps with learning may refer to the end part 130 to guide the learner.

The end part 130 may be provided in various ways, for example, numbers, letters, figures, images, or the like.

As shown in FIG. 2, in the case where only the stroke part 110 is formed, the visually impaired person needs to pay attention around the letter with the fingers so as to identify the start and the end of the letter, and thus it takes time to identify the letter.

In order to help the learner to learn the letter alone, the end part 130 may be provided in an uneven shape.

The end part 130 enables the point at which the stroke of the letter ends to be identified quickly, and thus the time required to identify the letter is shortened.

Therefore, it is preferable that both of the start part 120 and the end part 130 are provided.

As shown in FIG. 5, according to an embodiment of the present disclosure, the braille teaching material may further include a stroke order guidance section 400 in a preset area of the opened pages of the braille teaching material. The stroke order guidance section 400 shows symbols that correspond to the start parts 120 and are arranged in the same order as the strokes of the letter are written.

The stroke order guidance section 400 is for informing the stroke order of the letter. The teacher who helps with learning may refer to the stroke order guidance section 400 to guide the learner.

The stroke order guidance section 400 is for the visually impaired person to learn the stroke order of the letter.

That is, the number of strokes of the letter is identified using the number of start parts 120 provided in the stroke order guidance section 400. The order in which the strokes need to be written is identified from the stroke order guidance section 400.

In order to help the learner to learn the letter alone, the stroke order guidance section 400 may be provided in an uneven shape.

In FIG. 5, the stroke order guidance section 400 is provided at the upper left position, but the stroke order guidance section 400 may be positioned anywhere without being limited thereto.

As shown in FIGS. 5 and 6, according to an embodiment of the present disclosure, the braille section 200 of the braille teaching material shows which dots 210 correspond to the raised dots of braille, in a visual manner, in a tactile manner, or in a visual and tactile manner.

The dots 210 correspond to the raised dots may be embodied in various ways. For example, in terms of the visual sense, the dots 210 may be provided in outline, an ambient portion of the dots 210 may be provided in color, or the dots 210 may be provided in color. In terms of the tactile sense, the outline may be provided in an uneven shape, or the inside of the outline may be provided in an uneven shape.

This enables not only the visually impaired people but also the unimpaired people to identify which dots 210 correspond to the raised dots of braille, whereby even the unimpaired people who do not know braille are able to help the visually impaired person to learn braille.

That is, it is to easily identify whether the teaching tool 300 is attached to the correct position.

According to an embodiment of the present disclosure, the braille section 200 of the braille teaching material may include a velcro at the positions of the dots 210.

The velcro has a hook on one side and a velvet on the other, so that it can be attached and detached from each other. When a hook is formed at the positions of the dots 210, a velvet is formed to the teaching tool 300, and when a velvet is formed at the positions of the dots 210, a hook is formed to the teaching tool 300.

That is, among the dots 210, the velcro may be provided only at the positions of the dots 210 corresponding to the raised dots of braille that represent the information shown in the information section 100.

That is, the meaning part 220 may be formed of the velcro.

This is to allow the teaching tool 300 to be attached only to the dots 210 corresponding to the raised dots of braille that represent the information shown in the information section 100 by the velcro.

For this reason, the learner himself can also check by tactile sense what the dots 210 corresponds to the raised dots of braille.

In FIG. 1, the raised dot of braille representing the Korean letter "ㄱ" corresponds to only one dot 210 at the top right position, and the raised dots of braille representing the Korean letter "ㄴ" correspond to only two dots 210 at the top left position and the top right position. In FIG. 2, the raised dots of braille representing the Korean letter "ㄷ" correspond to only two dots 210 at the top right position and the middle left position.

In FIG. 1, the braille section 200 is provided on the right side of one page, and is a section where the braille letter corresponding to the Korean letter "ㄱ" and the braille letter corresponding to the Korean letter "ㄴ" are shown. In FIG. 2, the braille section 200 is provided on the right page among the opened pages of the braille teaching material, and is a section where the braille letter corresponding to the Korean letter "ㄷ" is shown.

FIGS. 1 and 2 show that the braille section 200 is provided on the right side with respect to the information section 100, but the present disclosure is not limited thereto. The braille section 200 may be embodied in various ways as being provided on the left side, the upper side, the lower side, and the like with respect to the information section 100.

The braille teaching material may be embodied in various ways. For example, the information section 100 and the braille section 200 in a pair may be provided on one opened side (one page) (see FIG. 1), may be provided on both opened sides (two pages) (see FIG. 2), or may be provided on one sheet (the front page and the back page).

Herein, the information section 100 and the braille section 200 in one pair refer to a pair configured to facilitate learning the braille letter corresponding to the learning information of the information section 100 (see FIGS. 1 and 2).

Herein, it is preferable that the information section 100 and the braille section 200 in one pair are provided in a preset learning area and a preset braille area, respectively, of the opened pages of the braille teaching material.

This is because it is possible to learn one letter without turning the page.

According to an embodiment of the present disclosure, the braille teaching material may include an NFC tag (not shown) and an NFC reader (not shown).

The NFC tag (not shown) is provided at a preset tag area, and stores information required for voice guiding the learning information.

When the NFC reader (not shown) recognizes the NFC tag (not shown), the NFC reader outputs the learning information in a voice.

NFC stands for "Near Field Communication" and refers to a wireless communication technology that transmits and receives data at a close range.

It is preferable that the tag area is set to an edge portion of the teaching material (book).

This is because the visually impaired person can most easily find the edge portion of the teaching material (book).

It is preferable that the NFC tag (not shown) is inserted into a page of the book.

This is to prevent the NFC tag (not shown) from being detached due to external contact, or the like.

The NFC tag (not shown) may be provided with a shielding film at a side that is opposite to a designated direction in which the NFC reader (not shown) recognizes the NFC tag, so that the NFC tag is not recognized by the NFC reader (not shown) in an undesired direction.

Accordingly, in the case where the braille teaching material according to an embodiment of the present disclosure is composed of multiple sheets of paper and an NFC tag (not shown) is provided at each sheet, wrong information is prevented from being output due to the NFC tag (not shown) other than information required for the sheet.

For example, when the NFC reader (not shown) is placed close to a tag area at page 1, a NFC tag (not shown) at another page is not recognized by the NFC reader (not shown).

As shown in FIG. 7, according to an embodiment of the present disclosure, a sheet provided with the dots 210 of the braille teaching material is formed by successively stacking an outer layer 1100 provided with the dots 210 in the form of holes, and an inner layer 1200 with a meaning part 220 formed to be distinguishable by the sense of the hand at a position of the dot 210.

Herein, the meaning part 220 may be formed in the inner layer 1200 some or all of the meaning part 220 to be exposed to the outside.

The sheet provided with the dots 210 of the braille teaching material according to an embodiment of the present disclosure may be bonded so that the outer layer 1100 and the inner layer 1200 are sequentially stacked.

In addition, in the sheet provided with the dots 210 of the braille teaching material according to an embodiment of the present disclosure, when the outer layer 1100 and the inner layer 1200 are sequentially stacked, it is preferable that the dots 210 are formed to be exposed to the outside.

Here, being exposed to the outside means that you can touch it with your hand. That is, it may be recessed or protruded.

As shown in FIG. 8, a method of manufacturing a braille teaching material according to an embodiment of the present disclosure includes an outer layer punching step S10, and a sheet manufacturing step S20.

At the outer layer punching step S10, the dots 210 in the outer layer 1100 are punched.

At the outer layer punching step S10, the dots 210 in the outer layer 1100 are punched as shown in FIG. 7. When using Louis Braille's braille system, six dots 210 per braille letter are punched.

At the outer layer punching step S10, a punch processing may be used.

The punch processing is processing for acquiring a product by performing punch processing on the basic material, and refers to processing in which after a hole in the basic material is made using a punch, the remaining basic material is a product. The punch processing is the opposite concept of blank processing.

At the sheet manufacturing step S20, the outer layer 1100 and the inner layer 1200, or the outer layer 1100, the inner layer 1200, and the outer layer 1100 are stacked in order and bonded, so that a sheep provided with the dots 210 is manufactured.

The sheet manufacturing step S20 is performed as follows.

When one sheet in which one outer layer 1100 is provided on one page is manufactured, the sheet provided the dots 210 is manufactured by bonding the outer layer 1100 and the inner layer 1200, or by bonding the inner layer 1200 and the outer layer 1100 in that order.

When one sheet in which two outer layers 1100 are provided on respective pages is manufactured, the sheet provided with the dots 210 is manufactured by stacking the outer layer 1100, the inner layer 1200, and the outer layer 1100 in order and bonding the layers.

The method of manufacturing a braille teaching material according to an embodiment of the present disclosure may be characterized in that the sheet provided with the dots 210 is formed using an adhesive sheet.

That is, the adhesive sheet may be first adhered to the outer layer 1100, the inner layer 1200, or the outer layer 1100 and the inner layer 1200, and then laminated and bonded.

This is to prevent the adhesive from being exposed to the outside and to prevent the surface from becoming unbalanced due to the concentration of the adhesive on one side.

At this time, it is preferable to attach the adhesive sheet only to the outer layer 1100. If the adhesive sheet is attached to the outer layer 1100 and then punch processing is performed, the adhesive sheet can be neatly adhered without being exposed to the outside.

The present disclosure is not limited to the above-described embodiments and has a wide range of application. Various modifications are possible without departing from the substance of the present disclosure set forth in the accompanying claims.

What is claimed is:

1. A braille teaching material comprising:
   an information section (100) having a stroke part (110) indicating a direction in which each stroke of a letter to be learned is written, wherein the information section is not formed in braille;
   a braille section (200) having a sheet comprising:
      an outer layer (1100) having dots (210) formed in a through-hole shape, the dots being arranged vertically and horizontally; and
      an inner layer (1200) having one or more meaning parts (220) protruded from a surface of the inner layer configured to be sensible by a hand,
      wherein the outer layer and the inner layer are configured to be stacked so that the outer layer covers an entire surface of the inner layer and the one or more meaning parts are inserted into the dots, wherein the one or more meaning parts being inserted into the dots are not exposed outside of the dots;
   a teaching tool (300) seated or detachably attached to one of the dots (210).

2. The braille teaching material of claim 1, wherein the information section (100) is formed with a shape from the group consisting of an engraved shape, a raised shape, and an embossed shape.

3. The braille teaching material of claim 1, wherein the stroke part (110) comprises a start part (120) indicating a point at which each stroke of the letter starts.

4. The braille teaching material of claim 3, further comprising:
   a stroke order guidance section (400) having symbols located next to the information section and corresponding to the start parts (120) so that the symbols are arranged in the same order as the strokes of the letter are written.

5. The braille teaching material of claim 1, wherein the braille section (200) shows which dot (210) corresponds to a raised dot of braille, in a visual manner, in a tactile manner, or in a visual and tactile manner.

6. The braille teaching material of claim 1, wherein the teaching tool (300) seated or detachably attached by an attaching part provided at a position of the dot (210).

7. The braille teaching material of claim 1, further comprising:
   an NFC tag provided in a preset tag area, and storing information required for voice guiding the learning information; and
   an NFC reader outputting the learning information in a voice when recognizing the NFC tag.

* * * * *